United States Patent

[11] 3,611,343

| [72] | Inventor | Herbert R. Schoenbach<br>Downers Grove, Ill. |
|---|---|---|
| [21] | Appl. No. | 840,649 |
| [22] | Filed | July 10, 1969 |
| [45] | Patented | Oct. 5, 1971 |
| [73] | Assignee | International Harvester Company<br>Chicago, Ill. |

[54] RATE-MEASURING SYSTEM
15 Claims, 3 Drawing Figs.

[52] U.S. Cl. .................................................. 340/271,
324/161, 324/168, 324/189
[51] Int. Cl. ....................................................... G08b 21/00
[50] Field of Search........................................... 340/271,
263, 239; 324/161, 168, 70

[56] References Cited
UNITED STATES PATENTS

| 3,156,115 | 11/1964 | Adelmann.................. | 324/70 X |
| 3,284,788 | 11/1966 | Hudson..................... | 340/271 X |
| 3,417,289 | 12/1968 | Jensen....................... | 324/168 UX |
| 3,456,188 | 7/1969 | Greenshields............... | 340/271 X |
| 3,480,859 | 11/1969 | Fichter...................... | 324/70 |
| 3,500,366 | 3/1970 | Chesney et al............. | 340/239 X |

Primary Examiner—John W. Caldwell
Assistant Examiner—Perry Palan
Attorney—Floyd B. Harman ABSTRACT: Rate-measuring system for measuring the velocity of rotation of a shaft, the rate of reciprocable movement of a part or for similar applications. A switch, preferably a magnetically operated reed switch, responds to movement of a part to periodically discharge a capacitor of a ramp generator, the voltage to which the capacitor is charged being inversely proportional to the rate of movement of the part. The voltage is stored by a storage capacitor connected to a voltage comparator which controls Schmitt trigger circuit operative to develop an indication as to whether the rate is less or greater than a certain value. Preferably, the ramp generator, voltage comparator and trigger circuit are connected to a common voltage supply.

PATENTED OCT 5 1971
3,611,343
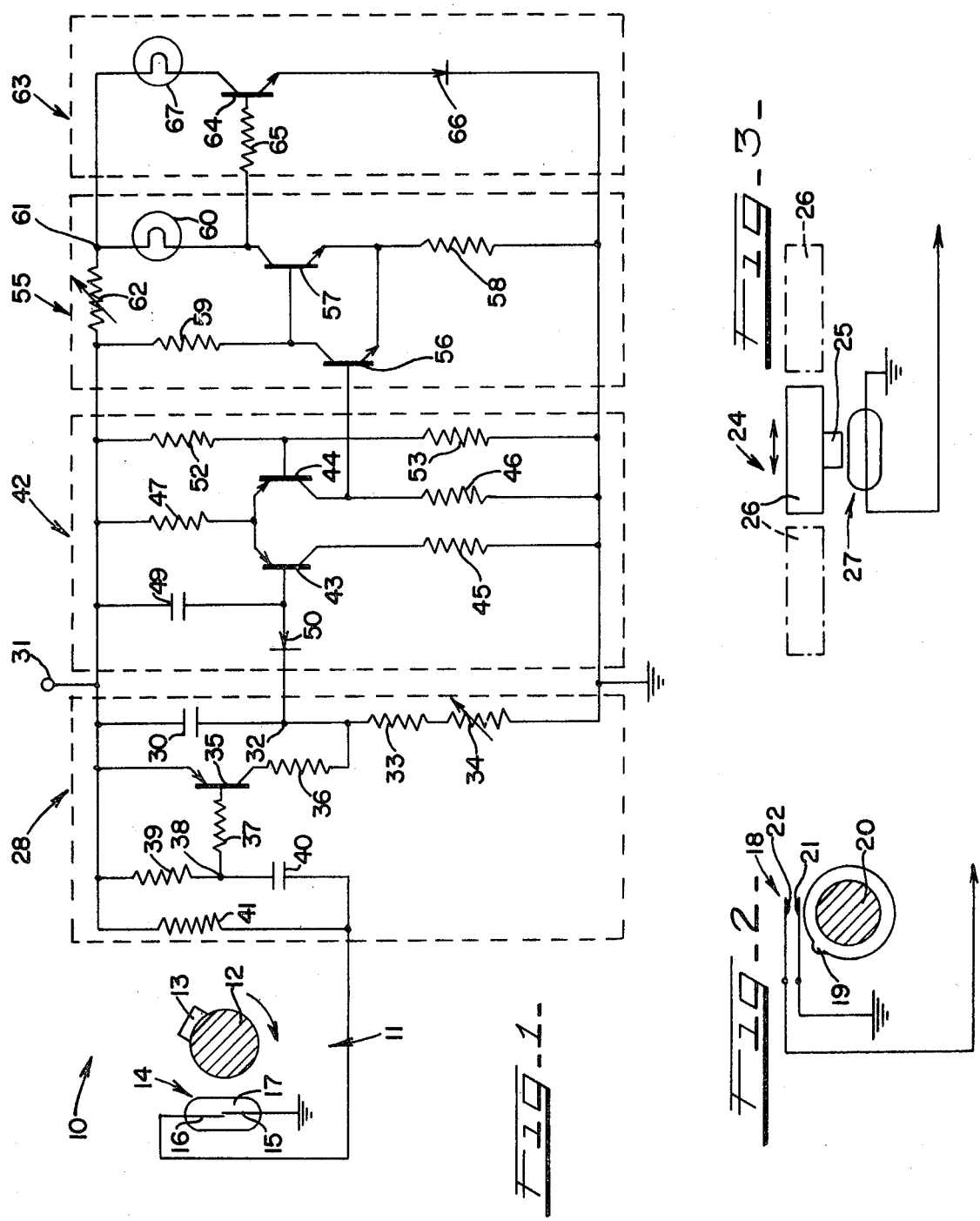
INVENTOR
HERBERT R. SCHOENBACH
BY
[signature] ATT'Y.

3,611,343

RATE-MEASURING SYSTEM

BACKGROUND OF THE INVENTION

1. Field of the Invention

This invention relates to a rate-measuring system and more particularly to a system operative to measure the velocity of rotation of a shaft, the rate of reciprocable movement of a part or the rate of similar movements. The system is highly sensitive, accurate and reliable while being compact and easily installed on a existing machine or in a machine being manufactured, and it is economically manufacturable.

2. Description of the Prior Art

Various rate-measuring systems have heretofore been proposed using tachometer generators or equivalent means such as impulse generators, to develop voltages proportional to speed. Such systems have been comparatively expensive to manufacture, difficult to install and have not been accurate and reliable.

SUMMARY

This invention was evolved with the general object of overcoming the disadvantages of prior art devices and of providing an improved rate measuring system.

A specific object of the invention is to provide a system usable to indicate the failure of proper rotation or movement of a part of a machine such as a combine, for example, in which belt slippage or breakage or other malfunctions can cause considerable damage and loss of time if not immediately detected.

According to this invention, sensing means are provided operable periodically at a rate proportional to the rate of movement of a part, the sensing means preferably comprising a switch having a pair of contacts periodically engaged in response to movement of a part. The contacts may be operated by a cam connected to a part or preferably, a magnetic reed switch is provided having a vane or vanes of magnetic material and magnet means carried by the part to be moved into proximity to the magnetic reed switch during movement of the part. The part may be rotatable, reciprocable or otherwise movable in a predetermined cyclic path and the switch may be operated once or another integer number of times during each rotation, reciprocation or cyclic movement of the part. Ramp generator means are controlled from the sensing means and are arranged to develop a signal of sawtooth form, the signal being fixed at a first level during each operation of the sensing means and being changed at a uniform rate to reach a second level prior to return to the first level at the next operation of the sensing means. Thus the difference between the first and second levels is generally inversely proportional to the velocity or rate of movement of the part. By measuring the difference between the levels, a highly accurate and reliable indication can be obtained.

In accordance with a specific feature of the invention, the ramp generator means comprises clamping means arranged to fix the charge of a capacitor at a certain level in response to each operation of the sensing means with the charge of the capacitor being changed at a uniform rate toward a different level between operations of the sensing means. Preferably, the clamping means are connected in parallel relation to the capacitor and the capacitor is charged from the voltage source through a suitable resistor.

Although the capacitor might be discharged or charged to a certain level directly from operation of contacts of the sensing means, a control device is preferably provided such as a transistor having a base electrode for controlling current therethrough, with capacitor coupling means between the control electrode and the sensing means, operative to render the transistor or other control device conductive for a short time interval in response to each operation of the sensing means. With this arrangement, the duration of operation of the sensing means is not critical and each operation will result in only one operation of the clamping means, so as to obtain a more sensitive and accurate measurement.

According to a further specific feature of the invention, the measuring means comprises a second capacitor coupled through a unidirectional conductive device to the ramp generator capacitor, to charge the second capacitor at the peak level, the second capacitor being thus operative as a storage or integrating device.

Another specific feature of the invention is in the provision of a voltage comparator circuit in the measuring means, operative to compare the output of the ramp generator with a reference voltage. Preferably, both the reference voltage supply and the ramp generator means are connected to a common voltage supply, to minimize the effect of variations in supply voltage.

Another important feature is in the provision of a trigger circuit switched from one condition to a second condition upon application of a certain voltage thereto, which voltage is proportional to the output of the ramp generator. The trigger circuit is preferably a Schmitt trigger circuit and is preferably connected to the same voltage supply as the ramp generator means and the voltage comparator.

The output of the trigger circuit may be used to energize suitable indicating means, to indicate that the rate of movement is either above or below a certain volume, or to energize any suitable control means or the like.

This invention contemplates other objects, features and advantages which will become more fully apparent from the following detailed description.

BRIEF DESCRIPTION OF THE DRAWING

FIG. 1 is a schematic diagram of a rate-measuring system constructed in accordance with the principles of this invention and including one preferred form of sensing means;

FIG. 2 is a schematic diagram of another form of sensing means usable in the system of FIG. 1; and FIG. 3 is a schematic diagram of a third form of sensing means usable in the system of FIG. 1.

DESCRIPTION OF THE PREFERRED EMBODIMENTS

Reference numeral 10 generally designates a rate measuring system constructed in accordance with the principles of this invention. The system 10 comprises sensing means, designated by reference numeral 11, arranged to respond to rotation of a shaft 12 which may, for example, be a shaft of a combine. In the operation of combines, the rotation of certain shafts may stop or may continue at a reduced speed, due to belt breakage or slipping and if such malfunctions are not quickly detected, continued operation of the machine may result in considerable damage.

The sensing means 11 comprises a permanent magnet 13 adhesively or otherwise secured to the shaft 12 and a magnetic reed switch 14 which comprises a pair of resilient vanes 15 and 16 of magnetic material in an envelop 17, the free ends of the vanes 15 and 16 being engaged by magnetic attraction during the portion of each revolution of the shaft 12 when the permanent magnet 13 passes in a path in proximity to the switch 14.

FIG. 2 illustrates an alternative type of sensing means, designated by reference numeral 18 in which a cam 19 on a rotating shaft 20 is arranged to engage a switch contact 21 to move it into engagement with a second contact 22, once during each rotation of the shaft 20 through 360°.

FIG. 3 illustrates another type of sensing means, designated by reference numeral 24, in which a permanent magnet 25 is adhesively or otherwise secured to a reciprocable member 26 and is arranged to actuate a magnetic reed switch 27, similar to the reed switch 14, at a position of the member 26 intermediate the extremes of travel thereof, indicated by broken lines. The switch 27 is thus actuated twice during each complete cycle of reciprocable movement of the member 26. It will be understood that the switch 27 could be positioned to be actuated at only one extreme of the travel of the member 26, so as to be actuated only once during each complete cycle of movement thereof. It should also be understood that additional magnets or cams may be provided to obtain any desired integer number of actuations during each rotation or cycle of movement of a movable member. Also, photoelectric or other means may be used in place of mechanically or magnetically operated switches, if desired.

The vane 15 of the switch 14 is connected to ground while the vane 16 is connected to a ramp generator generally designated by reference number 28. When the sensing means 18 of FIG. 2 is used, the contact 21 is connected to ground while the contact 22 is connected to the ramp generator 28 and, similarly, when the sensing means of FIG. 3 is used, one terminal of the switch 27 is connected to ground while the other is connected to the ramp generator 28.

The ramp generator 28 comprises a capacitor 30 one terminal of which is connected to a power supply terminal 31 which may be connected to the positive terminal of a DC source such as a storage battery, the negative terminal of the voltage source being connected to ground. The other terminal of the capacitor 30 is connected to a circuit point 32 which is connected through a fixed resistor 33 and an adjustable resistor 34 to ground. In the absence of other circuitry, the capacitor 30 would be charged exponentially upon application of the supply voltage, at a rate determined by the capacitance of the capacitor 30 and the resistance of the resistors 33 and 34. The capacitor 30 is, however, periodically discharged in response to operation of the sensing means 11. In particular, a transistor 35 is provided having an emitter connected to the power supply terminal 31 and having a collector connected through a resistor 36 to the circuit point 32. The base of the transistor 35 is connected through a resistor 37 to a circuit point 38 which is connected through a resistor 39 to the power supply terminal 31 and through a capacitor 40 to the vane 16, a resistor 41 being connected between vane 16 and power supply terminal 31.

In operation, when the vane 16 contacts the vane 15, current flows from the power supply terminal through the emitter-base junction of transistor 35, through resistor 37, capacitor 40 and the switch 17 to ground. The transistor 35 then conducts heavily, causing discharge of the capacitor 30 through the emitter-collector path of the transistor 35 and the current-limiting resistor 36. This operation continues for only a very short time interval, the capacitor 40 being rapidly charged and even though the sensing switch 17 remains closed for a substantial time interval, the conduction of transistor 35 is limited to a comparatively short time interval. After the sensing switch 17 opens, however, the capacitor 40 may discharge through resistors 39 and 41 to be nearly completely discharged at the next closure of the sensing switch 17.

With rotation of the shaft 12 at a constant speed, the level to which the potential of the circuit point 32 drips, just before each closure of the sensing switch 17, is dependent upon the speed of rotation. With a high speed of rotation, the potential level is relatively high while with very slow rotation, the potential level can drop to a value close to ground potential. The potential level is thus an indication of the speed of rotation of the shaft 12.

The output of the ramp generator 28, developed at the circuit point 32, is applied to a voltage comparator circuit generally designated by reference numeral 42. The circuit 42 comprises a pair of transistors 43 and 44 having collectors connected through resistors 45 and 46 to ground and having emitters connected together and through a resistor 47 to the power supply terminal 31. The base of the transistor 43 is connected through a capacitor 49 to the power supply terminal 31 and through a diode 50 to the circuit point 32. The base of the transistor 44 is connected through a resistor 53 to ground and through a resistor 52 to the power supply terminal 31.

In operation of the voltage comparator circuit 42, the capacitor 49 is charged in accordance with the peak charge developed across the capacitor 30 of the ramp generator 28. Thus the potential of the base 43 rises or falls in accordance with increases or decreases in the speed of rotation of the shaft 12. The capacitor 49 in combination with the diode 50 form a storage or integrating circuit to prevent rapid fluctuations in the potential of the base of the transistor 43 and to stabilize the operation.

The transistors 43 and 44 operate to compare the output voltage derived from the ramp generator 28, developed across the capacitor 49, with a reference voltage applied to the base of the transistor 44, which is a certain fraction, preferably one-half of the supply voltage. The operation is such that the output of the voltage comparator, developed at the collector of the transistor 44, is not affected by supply voltage variations within normal limits.

The output of the voltage comparator circuit, developed at the collector of the transistor 44, is applied to a Schmitt trigger circuit generally designated by reference numeral 55, which comprises two transistors 56 and 57. Emitters of the transistors 56 and 57 are connected together and through a resistor 58 to ground, the collector of the transistor 56 is connected to the base of the transistor 57 and through a resistor 59 to the power supply terminal 31 and the base of the transistor 56 is connected directly to the collector of the transistor 44. The collector of the transistor 57 is connected through a lamp 60 to a circuit point 61 which is connected through a variable resistor 62 to the power supply terminal 31.

In operation, when the speed of rotation of the shaft 12 drops below a certain set speed, the circuit 55 triggers in one direction to cause the transistor 57 to conduct heavily and to energize the lamp 60. Lamp 60 thus indicates when the speed is below a certain speed. When the speed is increased above the set speed, the circuit 55 triggers in the opposite direction to cut off conduction through the transistor 57 and to deenergize the lamp 60. To positively indicate this condition, an invertor circuit 63 is provided which comprises a transistor 64 having a base electrode connected through a resistor 65 to the collector of the transistor 57, an emitter connected through a diode 66 to ground and a collector connected through a lamp 67 to the circuit point 61. When the speed is above the set speed and the transistor 57 is nonconducting, a relatively high potential is applied through the resistor 65 to the base of the transistor 64 to cause the transistor 64 to conduct and to energize the lamp 67. Thus the lamp 67 indicates when the speed is above a set speed while the lamp 60 indicates when the speed is below a set speed. The intensity of the lamp may be controlled by adjustment of the variable resistor 62.

The set speed could be adjusted in various ways, but may preferably be adjusted by adjustment of the resistor 34 in the charging circuit for the capacitor 30 of the ramp generator 28.

Instead of or in addition to the lamps 60 and 67, other signal devices such as audible signal devices may be used to indicate when speed is above or below a set speed and the circuit can also be used to apply a control signal to a regulating system such as, for example, a system operative to control the drive speed of a shaft. Also, the output of the ramp generator 28 or the output of the voltage comparator 42 may be applied to a meter or other indicating device to directly indicate speed, or may be applied to a control system.

It will be understood that modifications and variations may be effected without departing from the spirit and scope of the novel concepts of this invention.

What is claimed is:

1. In a rate-measuring system, sensing means operable periodically at a rate proportional to the rate of movement of a part, said sensing means comprising a switch having a pair of contacts operable between an interengaged condition and a disengaged condition, and means for periodically operating said contacts from one of said conditions to the other and back again at said rate proportional to the rate of movement of the part, ramp generator means comprising capacitance means, clamping means including a control device having a control electrode and coupled to said capacitance means to operate when conductive to fix the charge of said capacitance means at a first level, charge changing means for changing the charge of said capacitance means toward a second level at a certain rate when said control device is nonconductive, and circuit means interconnecting said contacts and said control electrode and arranged to apply a signal to said control electrode to render said control device conductive during each operation of said contacts to said one of said conditions and to fix the charge of said capacitance means at said first level, and measuring means responsive to the difference between said levels, said control device and said circuit means being constructed and arranged to render said control device highly conductive during only a short duration time interval at the initial portion of each operation of said contacts to said one of said conditions to rapidly fix the charge of said capacitor at said first level.

2. In a system as defined in claim 1, said control device being in the form of a transistor having a base electrode forming said control electrode, and said circuit means including second capacitance means in series relation between said switch means and said base electrode and arranged to be rapidly charged during said short duration time interval to produce a high base current and thereby a high current conduction of said transistor during said short duration time interval.

3. In a rate-measuring system as defined in claim 1, said switch being a magnetic reed switch having a vane of magnetic material, and magnet means arranged to be carried by the part to be moved into proximity to said magnetic reed switch during movement of the part.

4. In a rate-measuring system as defined in claim 1, said operating means comprising a cam arranged for connection to the part, and said switch including an arm actuated by said cam.

5. In a rate-measuring system as defined in claim 1, wherein the part is a rotatable part, said sensing means being operable an integer number of times during each rotation of the part.

6. In a rate-measuring system as defined in claim 1, wherein the part is a reciprocable part, said sensing means being operable an integer number of times during each complete cycle of reciprocable movement of the part.

7. In a rate-measuring system as defined in claim 1, said measuring means comprising second capacitance means, and unidirectional conduction means connected in series with said second capacitance means across said ramp generator capacitance means to charge said second capacitance means to said second level.

8. In a rate-measuring system as defined in claim 1, said measuring means comprising a voltage comparator circuit having two inputs, reference voltage means for applying a reference voltage to one of said inputs, and means for applying to the other of said inputs a voltage proportional to the difference between said first and second levels.

9. In a rate-measuring system as defined in claim 8, means for connecting both said ramp generator means and said reference voltage supply means to a common voltage supply.

10. In a rate-measuring system as defined in claim 1, said measuring means comprising a trigger circuit switched from one condition to a second condition upon application of a certain voltage thereto, and means for applying to said trigger circuit a voltage proportional to the difference between said first and second levels.

11. In a rate-measuring system as defined in claim 10, said trigger circuit being a Schmitt trigger circuit.

12. In a rate-measuring system as defined in claim 10, said means for applying said voltage to said trigger circuit comprises a voltage comparator circuit having two inputs, reference voltage means for applying a reference voltage to one of said inputs, and means for applying to the other of said inputs a voltage proportional to the difference between said first and second levels.

13. In a rate-measuring system as defined in claim 12, means for connecting said ramp generator means, said reference voltage supply means and said trigger circuit to a common voltage supply.

14. In a rate-measuring system as defined in claim 10, signal means energized upon switching of said trigger circuit from said one condition to said second condition.

15. In a rate-measuring system as defined in claim 10, said trigger circuit being switched back to said one condition upon application of less than said certain voltage thereto, and signal means energized upon switching of said trigger circuit from said second condition to said on condition.